(12) United States Patent
Coscarella

(10) Patent No.: US 10,787,804 B2
(45) Date of Patent: Sep. 29, 2020

(54) WEATHER BARRIER FOR A BUILDING PENETRATION WITH A REMOVABLE COLLAR

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 16/038,003

(22) Filed: Jul. 17, 2018

(65) Prior Publication Data
US 2019/0017257 A1 Jan. 17, 2019

(30) Foreign Application Priority Data
Jul. 17, 2017 (CA) .................................... 2973567

(51) Int. Cl.
| E04B 1/62 | (2006.01) |
| E04B 1/66 | (2006.01) |
| H02G 3/22 | (2006.01) |
| F16L 5/10 | (2006.01) |

(52) U.S. Cl.
CPC ............. *E04B 1/625* (2013.01); *E04B 1/665* (2013.01); *F16L 5/10* (2013.01); *H02G 3/22* (2013.01)

(58) Field of Classification Search
CPC ... E04B 1/625; E04B 1/65; E04B 1/66; E04B 1/665; E04D 2001/307; E04D 13/14; F16L 5/10; H02G 3/22
USPC ................................................. 52/219, 220.8
See application file for complete search history.

(56) References Cited

U.S. PATENT DOCUMENTS

| 1,249,892 | A | * | 12/1917 | Bropson | ............. E04D 13/1476 |
| | | | | | 285/43 |
| 2,407,023 | A | | 9/1946 | Lockwood | |
| 2,670,976 | A | | 3/1954 | Owen | |
| 2,985,465 | A | * | 5/1961 | Church | ............... E04D 13/1476 |
| | | | | | 285/238 |
| 3,591,190 | A | | 7/1971 | Winay et al. | |
| 3,787,061 | A | | 1/1974 | Yoakum | |
| 3,788,655 | A | | 1/1974 | Hathaway | |
| 3,809,350 | A | | 5/1974 | Lane | |
| 3,881,752 | A | | 5/1975 | Fujishima | |
| 3,913,928 | A | | 10/1975 | Yamaguchi | |
| 4,086,736 | A | * | 5/1978 | Landrigan | ................. F16L 5/04 |
| | | | | | 248/56 |

(Continued)

FOREIGN PATENT DOCUMENTS

| CA | 2452668 A1 | 3/2005 | |
| CA | 2841366 A1 * | 8/2015 | ................ F16L 5/02 |

(Continued)

*Primary Examiner* — Robert Canfield
(74) *Attorney, Agent, or Firm* — Christensen O'Connor Johnson Kindness PLLC

(57) ABSTRACT

A weather barrier for a building penetration having opening in a wall of the building and a utility extending through the opening is provided. The weather barrier is made up of a sheet of flexible, weatherproof material, having a utility receiving chamber surrounded by a planar, building engaging section. The utility receiving chamber has a sidewall that extends perpendicularly to a plane defined by the building engaging section. A structural collar is sized and shaped to be friction fit within the sidewall of the utility receiving chamber, and is movable along the sidewall upon application of a sliding force. The structural collar has an inner circumference that receives an outer circumference of the utility.

19 Claims, 4 Drawing Sheets

(56) References Cited

U.S. PATENT DOCUMENTS

| | | | |
|---|---|---|---|
| 4,087,624 A | 5/1978 | Hitchcock | |
| 4,162,347 A | 7/1979 | Montgomery | |
| 4,265,058 A | 5/1981 | Logsdon | |
| 4,293,138 A | 10/1981 | Swantee | |
| 4,296,870 A | 10/1981 | Balkwill | |
| 4,350,351 A | 9/1982 | Martin | |
| 4,385,777 A | 5/1983 | Logsdon | |
| D269,454 S | 6/1983 | Houseman | |
| 4,386,488 A | 6/1983 | Gibbs | |
| 4,482,161 A | 11/1984 | Izzi, Sr. | |
| 4,526,407 A | 7/1985 | Kifer | |
| 4,548,853 A | 10/1985 | Bryan | |
| 4,563,847 A | 1/1986 | Hasty | |
| 4,570,943 A | 2/1986 | Houseman et al. | |
| 4,794,207 A | 12/1988 | Norberg | |
| 4,903,997 A | 2/1990 | Kifer | |
| 4,905,940 A | 3/1990 | Luka | |
| 4,927,039 A | 5/1990 | McNab | |
| 4,952,754 A | 8/1990 | Rye | |
| 5,015,700 A | 4/1991 | Blair | |
| 5,133,165 A | 7/1992 | Wimberly | |
| 5,226,263 A | 7/1993 | Merrin et al. | |
| 5,237,789 A | 8/1993 | Thaler | |
| 5,248,154 A | 9/1993 | Westhoff | |
| 5,287,665 A | 2/1994 | Rath, Jr. | |
| 5,347,776 A | 9/1994 | Skoff | |
| 5,501,472 A | 3/1996 | Brancher | |
| 5,549,266 A | 4/1996 | Mitchell et al. | |
| 5,557,078 A * | 9/1996 | Holwerda | B60R 13/0846 181/208 |
| 5,588,267 A | 12/1996 | Rodriguez et al. | |
| 5,829,214 A | 11/1998 | Hart | |
| 5,860,256 A | 1/1999 | Humber | |
| 5,944,361 A | 8/1999 | Bravo | |
| 6,079,751 A | 6/2000 | Youngs | |
| 6,161,589 A | 12/2000 | Bolotte et al. | |
| 6,185,885 B1 | 2/2001 | Thaler | |
| 6,239,365 B1 | 5/2001 | McEvers | |
| 6,315,849 B1 | 11/2001 | Ross | |
| 6,395,984 B1 | 5/2002 | Gilleran | |
| 6,417,447 B1 | 7/2002 | Bosse, Jr. | |
| 6,494,463 B1 | 12/2002 | Rank | |
| 6,543,186 B2 | 4/2003 | Gilleran | |
| 6,588,801 B1 | 7/2003 | Mayle | |
| 6,596,938 B2 | 7/2003 | Gilleran | |
| 6,649,835 B2 | 11/2003 | Gilleran | |
| 6,723,921 B2 | 4/2004 | Vagedes | |
| 6,860,070 B2 | 3/2005 | Gilleran | |
| 6,862,852 B1 | 3/2005 | Beele | |
| 6,891,104 B2 | 5/2005 | Dinh | |
| 6,951,081 B2 | 10/2005 | Bonshor | |
| 6,979,777 B2 | 12/2005 | Marcou et al. | |
| 7,005,578 B2 | 2/2006 | Gretz | |
| 7,176,377 B1 | 2/2007 | Gretz | |
| 7,192,219 B2 | 3/2007 | Graziosi | |
| 7,319,192 B1 | 1/2008 | Gretz | |
| 7,410,372 B2 | 8/2008 | Johnson et al. | |
| 7,435,900 B1 | 10/2008 | Gretz | |
| 7,568,314 B2 | 8/2009 | Collins | |
| 7,626,118 B1 | 12/2009 | Capozzi | |
| 7,637,385 B2 | 12/2009 | Wegner | |
| 7,645,937 B2 | 1/2010 | Bhosale | |
| 7,674,974 B1 | 3/2010 | Shotey | |
| 7,682,675 B2 | 4/2010 | Boge et al. | |
| 7,763,799 B2 | 7/2010 | Johnson | |
| 7,789,257 B2 | 9/2010 | Davis | |
| 7,802,798 B2 | 9/2010 | Beele | |
| 7,875,798 B2 | 1/2011 | Funk et al. | |
| 7,880,085 B2 | 2/2011 | Nurenburg et al. | |
| 7,918,066 B1 | 4/2011 | Bauer | |
| 3,046,955 A1 | 11/2011 | Chan et al. | |
| 8,079,599 B2 | 12/2011 | Meyers | |
| 8,156,700 B2 | 4/2012 | Umlor | |
| 8,490,353 B2 | 7/2013 | Beele | |
| 8,530,757 B2 | 9/2013 | Dinh | |
| 8,833,014 B2 | 9/2014 | Beele | |
| 8,933,331 B1 | 1/2015 | Gretz | |
| 9,228,689 B1 | 1/2016 | Cline et al. | |
| 2001/0052564 A1 | 12/2001 | Karlinger | |
| 2002/0179317 A1 | 12/2002 | Hurley | |
| 2003/0019163 A1 | 1/2003 | Dittel | |
| 2003/0037942 A1 | 2/2003 | Haselby et al. | |
| 2003/0178787 A1 | 9/2003 | Christie et al. | |
| 2004/0045233 A1* | 3/2004 | Beele | F16L 5/04 52/220.8 |
| 2005/0017610 A1 | 1/2005 | Mistry et al. | |
| 2005/0028456 A1 | 2/2005 | McLane et al. | |
| 2005/0042403 A1* | 2/2005 | Boge | E04D 13/1407 428/40.1 |
| 2005/0055889 A1 | 3/2005 | Thaler | |
| 2006/0027388 A1 | 2/2006 | Collins | |
| 2006/0130411 A1 | 6/2006 | Edgar et al. | |
| 2007/0245894 A1* | 10/2007 | Poulis | E02D 31/008 96/4 |
| 2008/0085336 A1 | 4/2008 | Mayle | |
| 2008/0124506 A1 | 5/2008 | Boge et al. | |
| 2008/0157518 A1* | 7/2008 | Cecilio | E02D 31/02 285/42 |
| 2009/0152820 A1 | 6/2009 | Meyers | |
| 2010/0059941 A1 | 3/2010 | Beele | |
| 2010/0263311 A1 | 10/2010 | Ryden | |
| 2011/0024993 A1 | 2/2011 | Happel et al. | |
| 2011/0056743 A1 | 3/2011 | Solan | |
| 2012/0090263 A1 | 4/2012 | Schaefer | |
| 2012/0279777 A1 | 11/2012 | Gagne et al. | |
| 2013/0231042 A1* | 9/2013 | Coscarella | F24F 13/082 454/339 |
| 2013/0234404 A1* | 9/2013 | Coscarella | F16L 5/02 277/606 |
| 2013/0264088 A1 | 10/2013 | Dinh | |
| 2014/0021688 A1 | 1/2014 | Hattori et al. | |
| 2014/0159359 A1 | 6/2014 | Beall | |
| 2014/0196271 A1* | 7/2014 | Coscarella | H02G 3/22 29/428 |
| 2014/0202758 A1 | 7/2014 | Lolachi | |
| 2014/0232106 A1* | 8/2014 | Mukai | F16L 5/02 285/194 |
| 2014/0260044 A1* | 9/2014 | Gilleran | F16L 5/10 52/506.1 |
| 2015/0075080 A1 | 3/2015 | Ellingson | |
| 2015/0076978 A1 | 3/2015 | Ellingson | |
| 2015/0085500 A1 | 3/2015 | Cooper et al. | |
| 2015/0218798 A1* | 8/2015 | Coscarella | E04B 1/66 52/741.3 |
| 2015/0218799 A1* | 8/2015 | Coscarella | E04B 1/625 52/404.1 |
| 2015/0218828 A1 | 8/2015 | Goddard | |
| 2015/0323103 A1* | 11/2015 | Coscarella | F16L 5/10 277/314 |
| 2016/0076673 A1* | 3/2016 | Rule | C09J 7/29 156/187 |
| 2016/0108611 A1* | 4/2016 | Gilleran | F16L 5/10 52/58 |
| 2016/0201325 A1 | 7/2016 | Moore | |
| 2016/0258165 A1 | 9/2016 | Walters | |
| 2019/0017257 A1* | 1/2019 | Coscarella | E04B 1/625 |
| 2020/0052473 A1* | 2/2020 | Gilstrap | E04B 2/70 |

FOREIGN PATENT DOCUMENTS

| | | | |
|---|---|---|---|
| CA | 2896296 A1 * | 1/2017 | H02G 3/22 |
| DE | 4131637 A1 | 4/1992 | |
| DE | 29800679 U1 * | 7/1998 | E04D 13/1407 |
| DE | 202012101447 U1 | 9/2012 | |
| DE | 202013100908 U1 | 8/2013 | |
| EP | 0161557 A2 | 11/1985 | |
| EP | 0176233 A1 * | 2/1986 | E04D 13/14 |
| EP | 2703703 A1 | 3/2014 | |
| EP | 2063163 B1 | 8/2014 | |

(56) References Cited

FOREIGN PATENT DOCUMENTS

| | | | | |
|---|---|---|---|---|
| FR | 2567240 A1 | * | 1/1986 | ............ E02D 31/02 |
| GB | 2216220 A | * | 10/1989 | ............ A62C 2/065 |
| JP | 2007040610 A | | 2/2007 | |

* cited by examiner

WEATHER BARRIER FOR A BUILDING PENETRATION WITH A REMOVABLE COLLAR

TECHNICAL FIELD

This relates generally to the weatherproofing of buildings, and in particular to providing a weather barrier for a building penetration in a wall of a building.

BACKGROUND

New construction, such as residential homes, often requires a building envelope made from a weatherproofing material, such as Tyvek™, which is a water resistant, breathable, flexible material that is placed on the outer walls of the building. This building envelope must be able to accommodate various protrusions through the wall, such as electrical boxes and utility pipes.

SUMMARY

According to an aspect, there is provided a weather barrier for a building penetration, the penetration comprising an opening in a wall of the building and a utility extending through the opening, the weather barrier comprising a sheet of flexible, weatherproof material, the sheet comprising a utility receiving chamber surrounded by a planar, building engaging section, the utility receiving chamber comprising a sidewall that extends perpendicularly to a plane defined by the building engaging section, and a structural collar that is sized and shaped to be friction fit within the sidewall of the utility receiving chamber, the structural collar being movable along the sidewall upon application of a sliding force, the structural collar having an inner circumference that receives an outer circumference of the utility.

According to another aspect, at least the utility receiving chamber may be resilient.

According to another aspect, the utility receiving chamber and the building engaging section may be integrally formed.

According to another aspect, the sidewall may have a rectangular or a rounded cross-section.

According to another aspect, the inner circumference of the structural collar may comprise a seal surface that, in use, sealingly engages the outer circumference of the utility.

According to another aspect, the sidewall of the sheet may comprise a closed end that is spaced from the plane of the building engaging section.

According to another aspect, the structural collar may comprise a closed end that is spaced outward from the sheet in the direction of the sidewall.

According to an aspect, there is provided a method of protecting a penetration in a wall of a building against weather, the method comprising the step of inserting a utility through an opening in the wall of the building, providing a weather barrier, comprising a sheet of flexible, weatherproof material, the sheet comprising a utility receiving chamber surrounded by a planar, building engaging section, the utility receiving chamber comprising a sidewall that extends perpendicularly to a plane defined by the building engaging section, and a structural collar that is sized and shaped to be friction fit within the sidewall of the utility receiving chamber, the structural collar being movable along the sidewall upon application of a sliding force, the structural collar having an inner circumference that is greater than an outer circumference of the utility, placing the weather barrier over the utility such that the utility is received within the utility receiving chamber and the building engaging section is immediately adjacent to the wall, moving the structural collar within the sidewall such that the structural collar is adjacent to an end of the utility, and applying a finishing material to the wall of the building, the finishing material overlying at least a portion of the building engaging section of the sheet.

According to another aspect, the utility receiving chamber may comprise a closed end wall that is spaced from the plane of the building engaging section.

According to another aspect, the method may further comprise the step of removing at least a portion of the end wall of the utility receiving chamber to provide access to the utility.

According to another aspect, removing at least a portion of the end wall may comprise removing a portion of the sidewall.

According to another aspect, the structural collar may comprise a sidewall having a closed end that is spaced outward along the sidewall from the sheet in the direction of the sidewall.

According to another aspect, the method may further comprise the step of removing at least a portion of the closed end of the structural collar to provide access to the utility.

According to another aspect, removing at least a portion of the closed end may comprise removing a portion of the sidewall of the structural collar.

According to another aspect, the method may further comprise the step of removing the structural collar from the utility receiving chamber.

According to another aspect, at least the utility receiving chamber may be resilient.

According to another aspect, the utility receiving chamber and the building engaging section may be integrally formed.

According to another aspect, the sidewall may have a rectangular or a rounded cross-section.

According to another aspect, placing the weather barrier over the utility may comprise sealingly engaging the inner circumference of the structural collar and the outer circumference of the utility.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
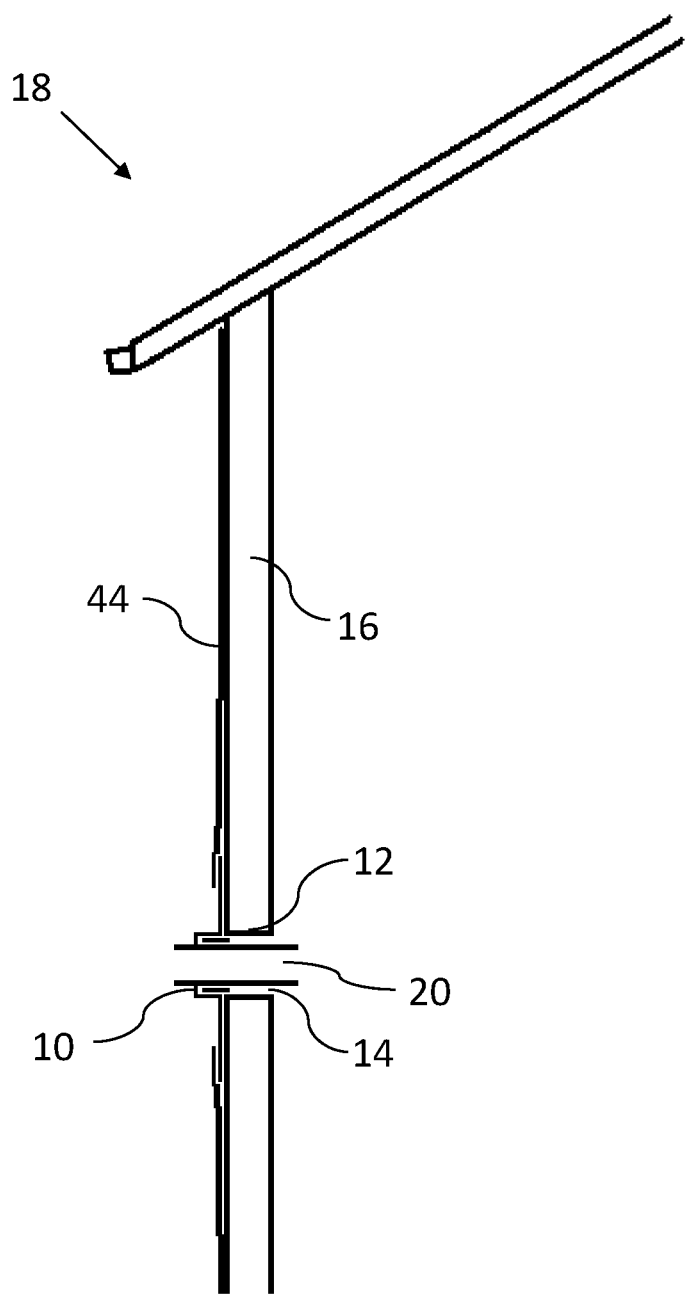
FIG. 1 is a side elevation view, in section, of a wall having a building penetration with a weather barrier.

A weather barrier generally identified by reference numeral 10, will now be described with reference to FIG. 1 through 6.

Figure 2:
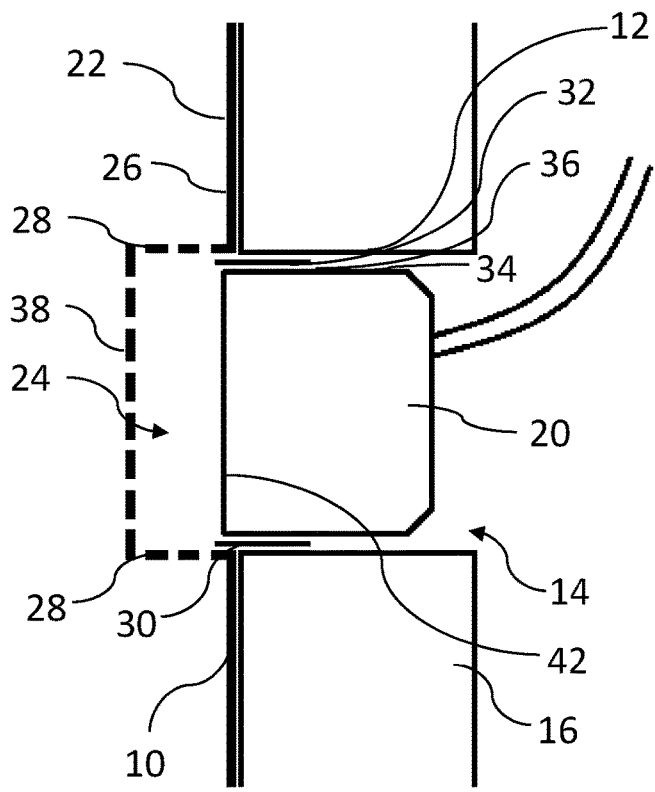
FIG. 2 is a side elevation view, in section, of a weather barrier having a removable collar and a trim shearable dust cap.
Figure 5:
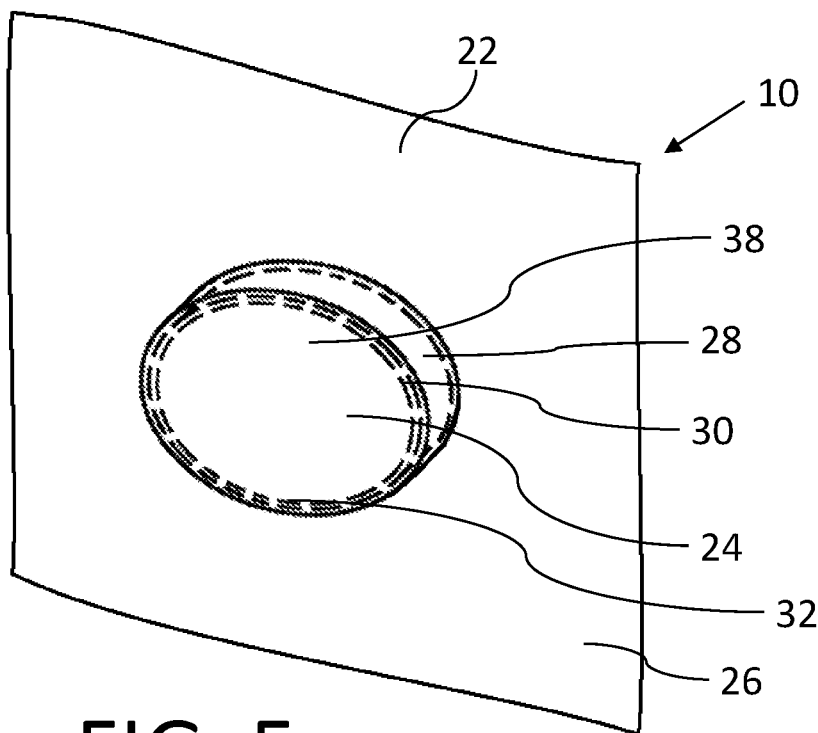
FIG. 5 is a perspective view of a round weather barrier.
Figure 6:
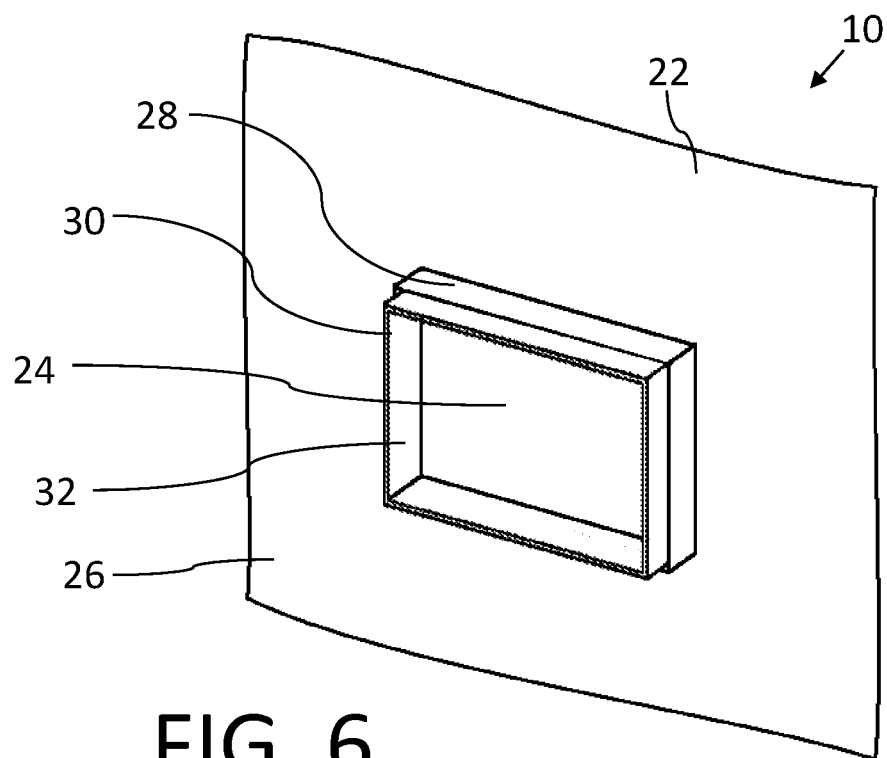
FIG. 6 is a perspective view of a rectangular weather barrier.

Referring to FIG. 1, a building penetration 12 is formed by an opening 14 in the wall 16 of a building 18, and a utility 20 extends through opening 14. Weather barrier 10 protects building penetration 12 from weather conditions such as rain, snow, and wind. Referring to FIG. 2, Weather barrier 10 is formed from a sheet 22 of flexible, weatherproof material and a structural collar 30. Sheet 22 has a utility receiving chamber 24 surrounded by a planar, building engaging section 26, utility receiving chamber 24 having a sidewall 28 that extends perpendicularly to a plane defined by building engaging section 26. In this context, perpendicularly refers to a direction that is away from building 18. In other words, the sidewall 28 extends outward from wall 16 of building 18, away from the interior of the building. While the sidewall 28 generally extends perpendicularly to wall 16, it is not required that each portion of sidewall 28 individually extend precisely ninety degrees to wall 16. For example, all or portions of sidewall 28 may taper inwardly or outwardly as they extend from wall 16 to form a narrower or wider opening at the far end of sidewall 28 from the wall. However, in this circumstance the sidewall 28 generally will still extend outward from wall 16. As shown, this results in building engaging section 26 being placed against wall 16, and sidewall 28 extending outwards from building 18 and wall 16. Referring to FIG. 5 and FIG. 6, sidewall 28 is shown with a round and a rectangular cross section, respectively. Sidewall 28 may also take other shapes as required to accommodate the particular utility 20 and building penetration 12, or to provide a universal fit.

Referring to FIG. 5 and FIG. 6, utility receiving chamber 24 and building engaging section 26 may be integrally formed from the same materials, or they may be separately formed and attached together, such as with adhesive, by moulding utility receiving chamber 24 onto building engaging section 26, or with other techniques that are known in the art. For example, utility receiving chamber 24 may be formed of a resilient material, and building engaging section 26 may be formed of a resilient material, or non-resilient building wrap material, as is known in the art. Preferably, building engaging section 26 is formed from a material that is suitable to be used with finishing material 44 that surrounds building penetration 12 on wall 16.

Figure 3:
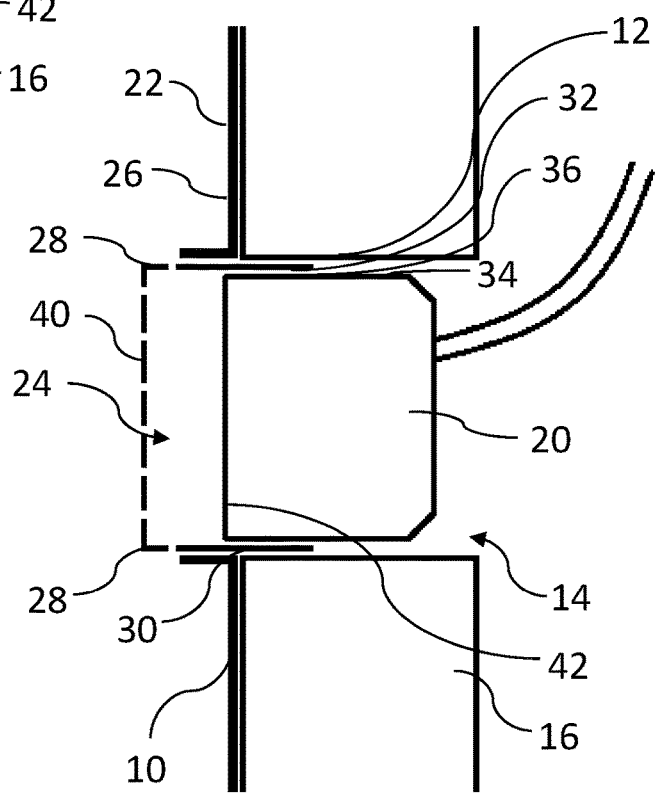
FIG. 3 is a side elevation view, in section, of a weather barrier having a removable collar that is trim shearable.
Figure 4:
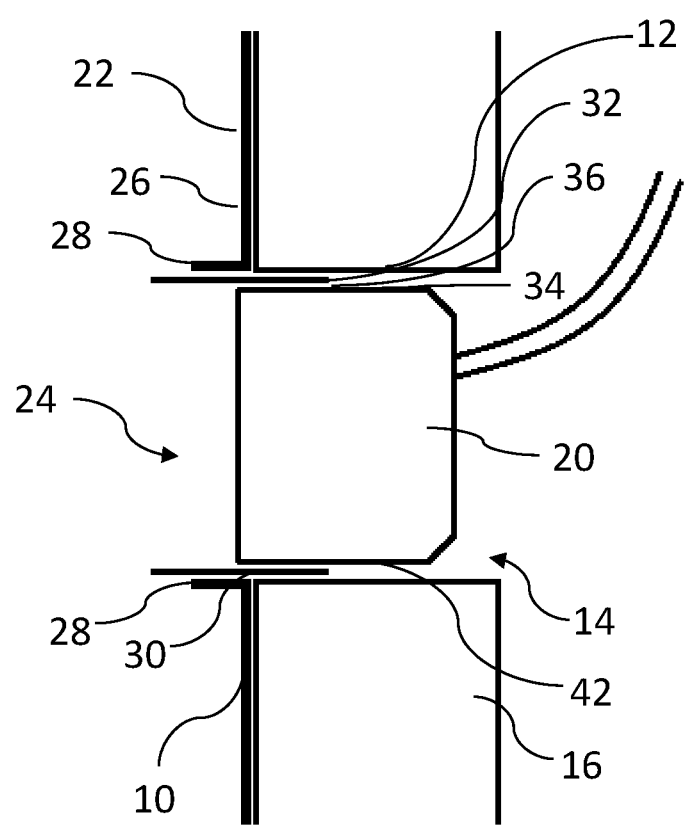
FIG. 4 is a side elevation view, in section, of a weather barrier having no dust cap.

Referring to FIG. 2 through FIG. 4, structural collar 30 is sized and shaped to be friction fit within sidewall 28 of utility receiving chamber 24, and structural collar 30 is movable along sidewall 28 upon application of a sliding force. Structural collar 30 has an inner circumference 32 that receives an outer circumference 34 of utility 20. As structural collar 30 is friction fit within sidewall 28, a seal is formed between sidewall 28 and structural collar 30. Structural collar 30 may be sized to be spaced from utility 20, or to also form a seal against utility 20, depending upon the application and needs of the user. The inner circumference 32 of structural collar 30 may form a seal surface 36 that, in use, sealingly engages the outer circumference 34 of utility 20.

Referring to FIG. 2, sidewall 28 of sheet 22 has a closed end 38 that is spaced from the plane of building engaging section 26. Closed end 38 acts as a dust cover, and may be removable, which will generally be done after installation. Closed end 38 may be removable by forming some or all of it using a cuttable material, providing it with one or more cut lines, connecting it by a frangible connection, etc. For example, weather barrier 10 may be installed, a wall covering material may be applied to the wall such that it overlaps with building engaging section 26, and then after the wall covering material is completed, closed end 38 may be opened to provide access to utility 20. In other circumstances, it may be desirable to leave closed end 38 intact over utility 20. Alternatively, a closed end 40 may be provided on structural collar 30, as shown in FIG. 3. Closed end 40 may also remain intact, or be removed after installation of weather barrier 10. When a closed end 38 or 40 is not required, these surfaces may also be omitted, as shown in FIG. 4. It will be understood that closed end 38 of sheet 22 may be opened by creating a separation along sidewall 28 or removing a portion of closed end 38, or closed end 40 of structural collar 30 may be opened by creating a separation along collar 30, or removing a portion of closed end 40. this may be useful, for example, to allow sheet 22 or collar 30 to seal against or otherwise support a utility installed in building penetration 12.

A method of protecting a building penetration 12 in a building 18 against weather will now be described, referring to FIG. 2. Utility 20 is inserted through an opening 14 in wall 16 of building 18. Weather barrier 10 is placed over utility 20 so that utility 20 is received within utility receiving chamber 24 and building engaging section 26 is immediately adjacent to wall 16. A sliding force can then be applied against the friction fit between structural collar 30 and sidewall 28 to move structural collar 30 to be adjacent to an end 42 of utility 20. A finishing material 44 may then be applied to wall 16, as shown in FIG. 1, finishing material 44 overlying at least a portion of building engaging section 26 of sheet 22. As described above, if a closed end 38 or 40 is provided on sidewall 28 or structural collar 30, respectively, at least a portion of that closed end 38 or 40 may be removed to provide access to utility 20 once finishing material 44 has been applied. The amount that is removed of closed end 38 or 40 may vary depending on the desire of the user. The entire closed end 38 or 40, as well as a portion of sidewall 28 or structural collar 30 may be removed, for example, to cause weather barrier 10 to be flush with finishing material 44. Alternatively, an opening that is smaller than the entire closed end 38 or 40 may be formed in the end to provide access to utility receiving chamber 24. In some cases, structural collar 30 may only be required during the installation of weather barrier 10 and finishing material 44, and structural collar 30 may be entirely removed from utility receiving chamber 24 after finishing material 44 has been applied, leaving sidewall 28 surrounding utility 20. For example, finishing material 44 may be rigid and provide sufficient structural support to sidewall 28 after installation is complete, allowing structural collar 30 to be removed.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A weather barrier for a building penetration, the building penetration comprising an opening in a wall of a building and a utility extending through the opening, the weather barrier comprising:
   a sheet made from a precipitation and wind resistant material, the sheet comprising a utility receiving chamber surrounded by a planar, building engaging section, the utility receiving chamber comprising a sidewall that extends perpendicularly to a plane defined by the building engaging section and terminates at a remote end; and a structural collar that is friction fit within the sidewall of the utility receiving chamber, the structural collar having a first end face, a second end face, and a constant outer circumference between the first end face and the second end face, the structural collar being movable along the sidewall upon application of a sliding force between a first position in which the first end face is immediately adjacent to the remote end of the utility receiving chamber and a second position in which the first end face extends past the remote end of the utility receiving chamber, the structural collar having an inner circumference that receives an outer circumference of the utility.

2. The weather barrier of claim 1, wherein at least the utility receiving chamber is resilient.

3. The weather barrier of claim 1, wherein the utility receiving chamber and the building engaging section are integrally formed.

4. The weather barrier of claim 1, wherein the sidewall has a rectangular or a rounded cross-section.

5. The weather barrier of claim 1, wherein the inner circumference of the structural collar comprises a seal surface that, in use, sealingly engages the outer circumference of the utility.

6. A weather barrier for a building penetration, the building penetration comprising an opening in a wall of a building and a utility extending through the opening, the weather barrier comprising:

a sheet made from a precipitation and wind resistant material, the sheet comprising a utility receiving chamber surrounded by a planar, building engaging section, the utility receiving chamber comprising a sidewall that extends perpendicularly to a plane defined by the building engaging section; and a structural collar that is friction fit within the sidewall of the utility receiving chamber, the structural collar being movable along the sidewall upon application of a sliding force, the structural collar having an inner circumference that receives an outer circumference of the utility;

wherein the sidewall of the sheet or the structural collar comprises a closed end that is spaced from the plane of the building engaging section of the sheet.

7. A method of protecting a penetration in a wall of a building against weather, the method comprising the step of:

inserting a utility through an opening in the wall of the building;

providing a weather barrier, comprising:

a sheet of precipitation and wind resistant material, the sheet comprising a utility receiving chamber surrounded by a planar, building engaging section, the utility receiving chamber comprising a sidewall that extends perpendicularly to a plane defined by the building engaging section; and a structural collar that is sized and shaped to be friction fit within the sidewall of the utility receiving chamber, the structural collar being movable along the sidewall upon application of a sliding force, the structural collar having an inner circumference that is the same as or greater than an outer circumference of the utility;

placing the weather barrier over the utility such that the utility is received within the utility receiving chamber and the building engaging section is immediately adjacent to the wall;

after placing the weather barrier over the utility, moving the structural collar within the sidewall and relative to the utility; and applying a finishing material to the wall of the building, the finishing material overlying at least a portion of the building engaging section of the sheet.

8. The method of claim 7, wherein the utility receiving chamber comprises a closed end wall that is spaced from the plane of the building engaging section.

9. The method of claim 8, further comprising the step of removing at least a portion of the end wall of the utility receiving chamber to provide access to the utility.

10. The method of claim 9, wherein removing at least a portion of the end wall comprises removing a portion of the sidewall.

11. The method of claim 7, wherein the structural collar comprises a closed end that is spaced outward from the sheet in the direction of the sidewall.

12. The method of claim 11, further comprising the step of removing at least a portion of the closed end of the structural collar to provide access to the utility.

13. The method of claim 12, wherein removing at least a portion of the closed end comprises removing a portion of the sidewall of the structural collar.

14. The method of claim 7, further comprising the step of removing the structural collar from the utility receiving chamber.

15. The method of claim 7, wherein at least the utility receiving chamber is resilient.

16. The method of claim 7, wherein the utility receiving chamber and the building engaging section are integrally formed.

17. The method of claim 7, wherein the sidewall has a rectangular or a rounded cross-section.

18. The method of claim 7, wherein placing the weather barrier over the utility comprises sealingly engaging the inner circumference of the structural collar and the outer circumference of the utility.

19. The method of claim 7, wherein the structural collar extends from the utility receiving chamber to traverse the plane defined by the building engaging section.

* * * * *